(12) United States Patent
Simms

(10) Patent No.: US 9,434,227 B2
(45) Date of Patent: Sep. 6, 2016

(54) SUSPENSION SYSTEM

(71) Applicant: Michael Stephen Simms, Reedsville, WV (US)

(72) Inventor: Michael Stephen Simms, Reedsville, WV (US)

( * ) Notice: Subject to any disclaimer, the term of this patent is extended or adjusted under 35 U.S.C. 154(b) by 0 days.

(21) Appl. No.: 14/493,433

(22) Filed: Sep. 23, 2014

(65) Prior Publication Data
US 2016/0082799 A1 Mar. 24, 2016

(51) Int. Cl.
*B60G 11/27* (2006.01)
*B60G 11/26* (2006.01)
*B60R 19/00* (2006.01)

(52) U.S. Cl.
CPC ............... *B60G 11/27* (2013.01); *B60G 11/26* (2013.01); *B60R 19/00* (2013.01)

(58) Field of Classification Search
CPC ...... B60G 11/27; B60G 11/32; B60G 11/465
See application file for complete search history.

(56) References Cited

U.S. PATENT DOCUMENTS

| | | | | | |
|---|---|---|---|---|---|
| 1,679,268 | A | * | 7/1928 | Rigney | B60G 11/465 267/241 |
| 2,874,956 | A | * | 2/1959 | La Belle | B60G 11/465 267/241 |
| 2,879,076 | A | * | 3/1959 | Stricker, Jr. | B60G 5/04 267/256 |
| 2,998,261 | A | * | 8/1961 | Bartlett | B60G 5/005 105/198.1 |
| 3,039,787 | A | * | 6/1962 | Meyer | B60G 7/005 280/124.136 |
| 3,073,621 | A | * | 1/1963 | Wedzinga | B60G 11/27 267/64.27 |
| 3,904,220 | A | * | 9/1975 | Fier | B60G 11/465 180/24.02 |
| 3,970,293 | A | * | 7/1976 | Sweet | B60G 11/465 267/241 |
| 4,690,427 | A | * | 9/1987 | Raidel, Sr. | B60G 3/00 280/124.118 |
| 4,706,988 | A | * | 11/1987 | Young | B60G 5/047 267/31 |
| 4,934,733 | A | * | 6/1990 | Smith | B60G 3/207 280/124.132 |
| 5,464,245 | A | * | 11/1995 | Vogler | B60G 11/465 280/124.163 |
| 6,056,305 | A | * | 5/2000 | Pribyl | B60G 7/02 280/124.157 |
| 6,068,276 | A | * | 5/2000 | Kallstrom | B60G 11/27 280/124.157 |
| 6,340,165 | B1 | * | 1/2002 | Kelderman | B60G 7/001 280/124.153 |
| 7,730,581 | B2 | * | 6/2010 | Mirick | E05D 11/02 16/273 |

(Continued)

*Primary Examiner* — Barry Gooden, Jr.
(74) *Attorney, Agent, or Firm* — Dunlap Bennett & Ludwig PLLC

(57) ABSTRACT

A suspension system is provided. The suspension system may provide a straightforward framework having spaced-apart, pivotably-connected suspension plates having at least one of air bag compactly nested there between. In certain embodiments, the suspension system may provide a U-shaped bracket perpendicularly joined to one of the suspension plates, forming a generally centrally-located shelf nook thereto, wherein another air bag may be compactly nested. The suspension system may provide an operable air supply that can adjust the air pressure of the plurality of air bags while in use.

9 Claims, 3 Drawing Sheets

(56) References Cited

U.S. PATENT DOCUMENTS

| | | | |
|---|---|---|---|
| 2002/0105170 A1* | 8/2002 | Smith | B60G 3/14 280/683 |
| 2003/0159248 A1* | 8/2003 | Gulley | E05D 11/02 16/273 |
| 2004/0021302 A1* | 2/2004 | English | B60G 5/02 280/678 |
| 2004/0026900 A1* | 2/2004 | English | B60G 5/02 280/677 |
| 2004/0070157 A1* | 4/2004 | Boice | B60G 9/00 280/6.15 |
| 2006/0103102 A1* | 5/2006 | Mullican | B60G 9/00 280/124.162 |
| 2007/0108711 A1* | 5/2007 | Smith | B60G 9/00 280/86.5 |
| 2008/0172832 A1* | 7/2008 | Mirick | E05D 11/02 16/273 |
| 2008/0272562 A1* | 11/2008 | Sabelstrom | B60G 11/27 280/6.153 |
| 2008/0284123 A1* | 11/2008 | Billian | B60G 9/003 280/124.116 |
| 2009/0278329 A1* | 11/2009 | VanDenberg | B60G 11/225 280/124.13 |
| 2010/0001444 A1* | 1/2010 | Weber | B60G 7/04 267/64.21 |
| 2010/0225092 A1* | 9/2010 | Hudson | B60D 1/00 280/494 |
| 2010/0237574 A1* | 9/2010 | Allaire | B60G 5/02 280/28.5 |
| 2011/0266764 A1* | 11/2011 | VanDenberg | B60G 3/145 280/124.111 |
| 2013/0330157 A1* | 12/2013 | Asztalos | A61G 3/065 414/469 |
| 2014/0191487 A1* | 7/2014 | Sachan | B60G 11/27 280/124.157 |
| 2015/0167772 A1* | 6/2015 | Street | F16F 9/0454 267/64.27 |

* cited by examiner

SUSPENSION SYSTEM

BACKGROUND OF THE INVENTION

The present invention relates to suspensions systems and, more particularly, to a suspension system incorporating at least one adjustable air-bag within a pivotably connected framework.

Installing a suspension system extends the life of equipment and makes for a more comfortable vehicular ride. Currently, suspension systems are well known in the art, but are costly designs utilized during initial construction.

However, a suspension system using adjustable air bags within a straightforward pivotably connected framework enable adjustability, greater flexibility and easy retro-fitting, which in turn would increase vehicular comfort well as lessen the wear and tear on all installed equipment, thus causing less down time and maintenance cost.

As can be seen, there is a need for a suspension system that provides adjustable air bags nested within a pivotably connected framework.

SUMMARY OF THE INVENTION

In one aspect of the present invention, a suspension system providing adjustable air bags, comprises: a pair of spaced-apart suspension plates, each having a first edge; a pivotable connection interconnecting the pair of first edges, thereby forming a shelf space between the pair of suspension plates; and a plurality of air bags having an adjustable air pressure, wherein the plurality of air bags are nested within the shelf space, wherein the air pressure is adjusted so as to at least snugly secure the plurality of air bags therein.

In another aspect of the present invention, a suspension system providing adjustable air bags, comprises: a first and second suspension plate, each having a connection edge, wherein the first suspension plate defines two cooperating slots; a pivotable connection interconnecting the first and second connection edges, forming a shelf space between the suspension plates, and wherein the pivotable connection comprises; at least two rails sandwiching a plurality of spaced-apart hinge sleeves; and a hinge pin slidably received through the plurality of hinge sleeves, wherein the plurality of hinge sleeves includes a plurality of grease fittings for providing lubrication for the hinge pin; a U-bracket having two legs slidably received into the two slots and through the shelf space so as to perpendicularly connect to the second suspension plate forming a shelf nook between the U-bracket and a portion of the first suspension plate; three air bags having an adjustable air pressure, wherein two of the three air bags are nested within the shelf space at opposing ends thereof, wherein a third air bag is nested within the shelf nook; and an air supply connected to at least one of the first and second suspension plates, wherein the air supply is operably connected to the three of air bags.

In yet another aspect of the present invention, a method of improving the impact absorption of a pre-existing vehicle, comprises the steps of: providing a pair of suspension plates, each having a first edge; spacing the pair of suspension plates apart by interconnecting a pivotable connection between the pair of first edges, thereby forming a shelf space between the pair of suspension plates; and nesting a plurality of air bags having an adjustable air pressure within the shelf space; adjusting the air pressure of the plurality of air bags until the plurality of air bags are snugly secured; and connecting one of the pair of suspension plates to an undercarriage of the pre-existing vehicle, whereby substantially absorbing impact forces thereon.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention is a suspension system providing a straightforward framework having spaced-apart, pivotably-connected suspension plates having at least one of air bag compactly nested there between. In certain embodiments, the suspension system may provide a U-shaped bracket perpendicularly joined to one of the suspension plates, forming a generally centrally-located shelf nook thereto, wherein another air bag may be compactly nested. The suspension system may provide an operable air supply that can adjust the air pressure of the plurality of air bags while in use.

Referring to FIGS. 1 through 5, the present invention may include a suspension system 10. The suspension system 10 may include a framework 90 and a plurality of air bags 36 nested therein.

Figure 2:
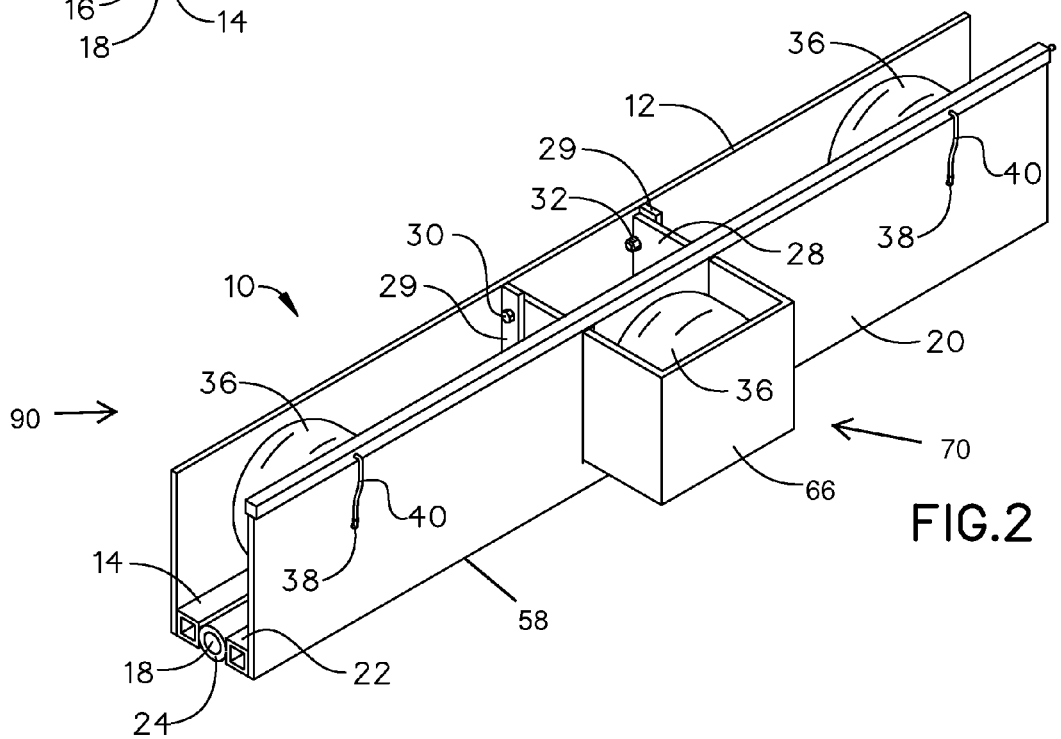
FIG. 2 is a rear perspective view of an exemplary embodiment of the present invention.

The framework 90 may take various shapes; preferably a T-shape, as illustrated in FIG. 2. The framework 90 provides a compact structure utilizing parallel, pivotably-connected suspension plates 12, 20 biased by the plurality of air bags 36 to provide spring suspension action. The pair of suspension plates may include a first plate 12 and a second plate 20 that define a shelf space there between. Each suspension plate 12, 20 may define a first edge 56, 58, respectively, which are interconnected by a pivotal connection 60.

Figure 3:
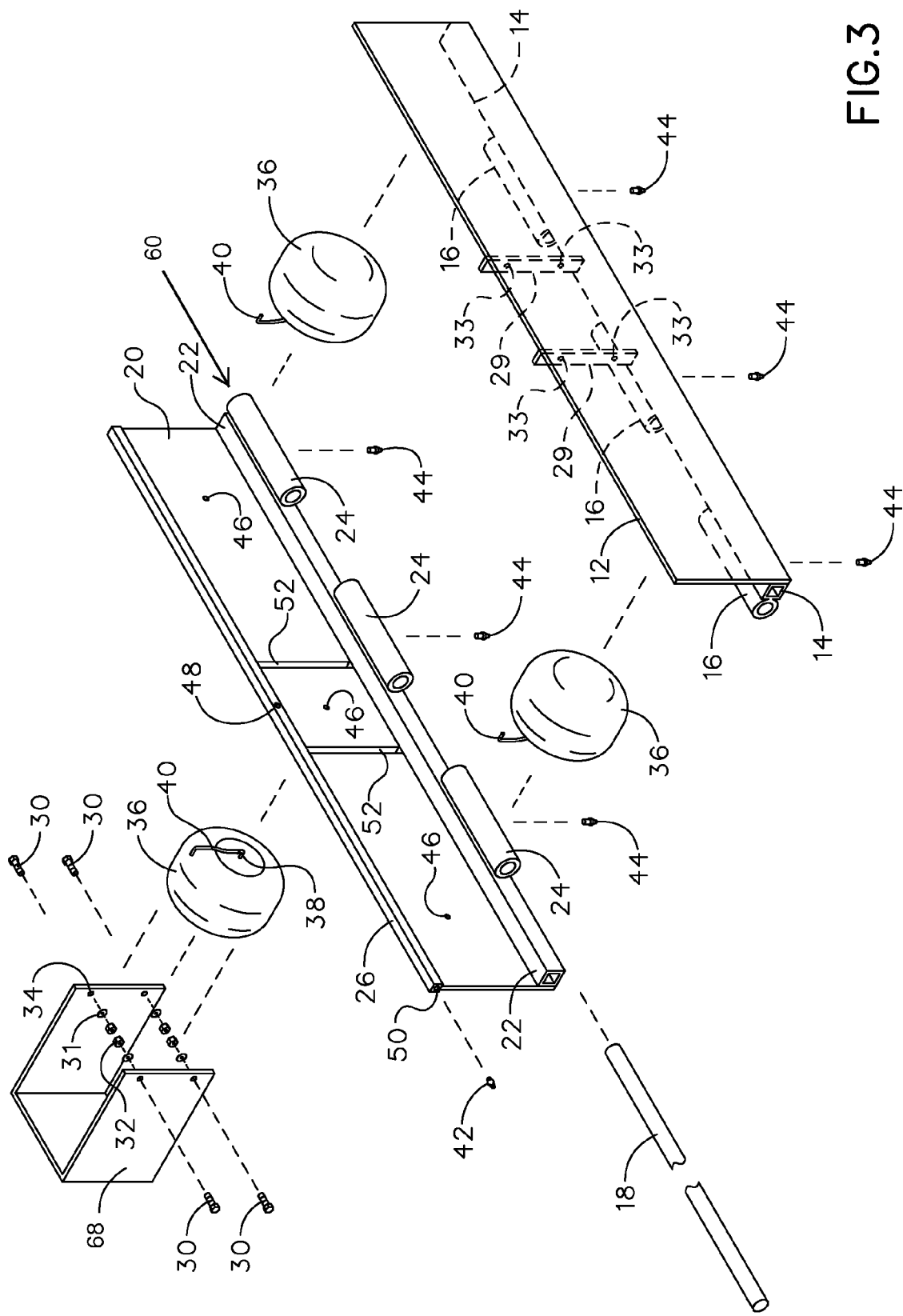
FIG. 3 is an exploded view of an exemplary embodiment of the present invention.
Figure 4:
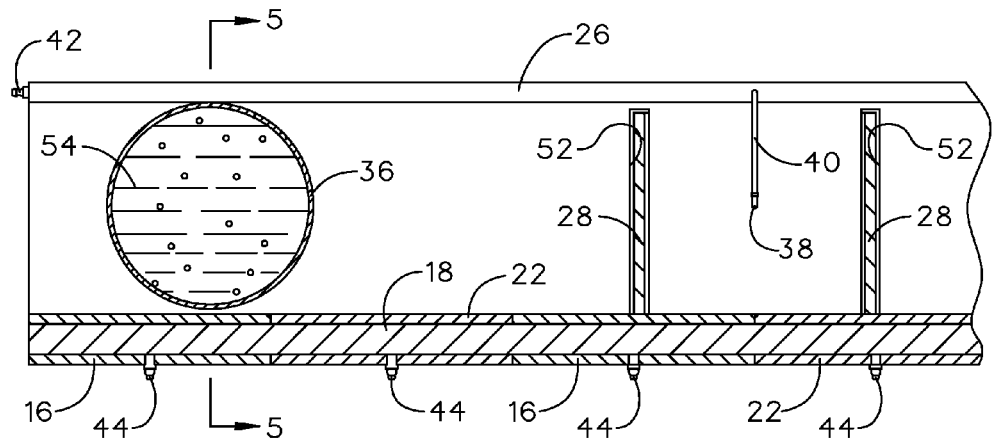
FIG. 4 is a section view of an exemplary embodiment of the present invention taken along line 4-4 in FIG. 1.
Figure 5:
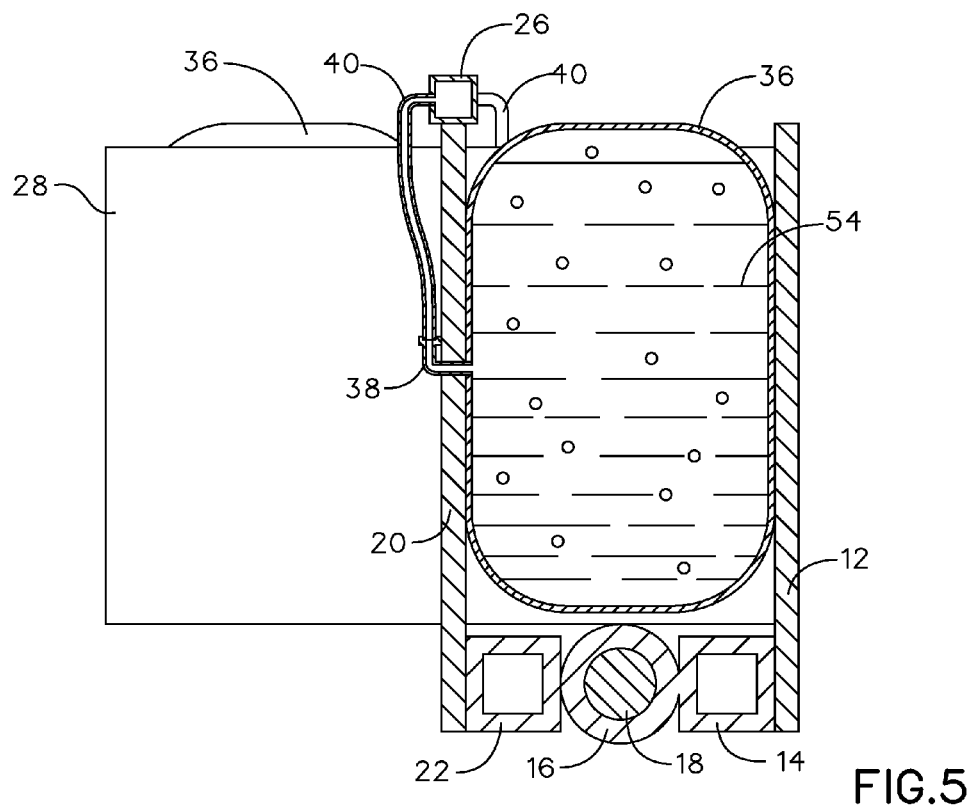
FIG. 5 is a section view of an exemplary embodiment of the present invention taken along line 5-5 in FIG. 4.

The pivotal connection 60 may include two rails 14, 22 extending along and connected to portions of the first edge 56, 58, respectively. Intermittently connect along the rails 14, 22 may be a plurality of cooperating hinge sleeves 16, 24, respectively. All hinge sleeves 16, 24 align when the pair of plates 12, 20 are operably connected by the pivotal connection 60 so as to snuggly receive a hinge pin 18 through all hinge sleeves 16, 24, as illustrated in FIGS. 3. Lubrication to facilitate the pivotably movement of the hinge pin 18 within the aligned lumens of the hinge sleeves 16, 24 may be provided via a plurality of grease fittings 44 or the like. Other means of pivotably connecting the pair of plates 12, 20 may be used as long as the pair of spaced apart suspension plates 12, 20 function in accordance with the present invention as described herein, such as affording space to compactly nest the plurality of air bags 36 therein.

Figure 1:
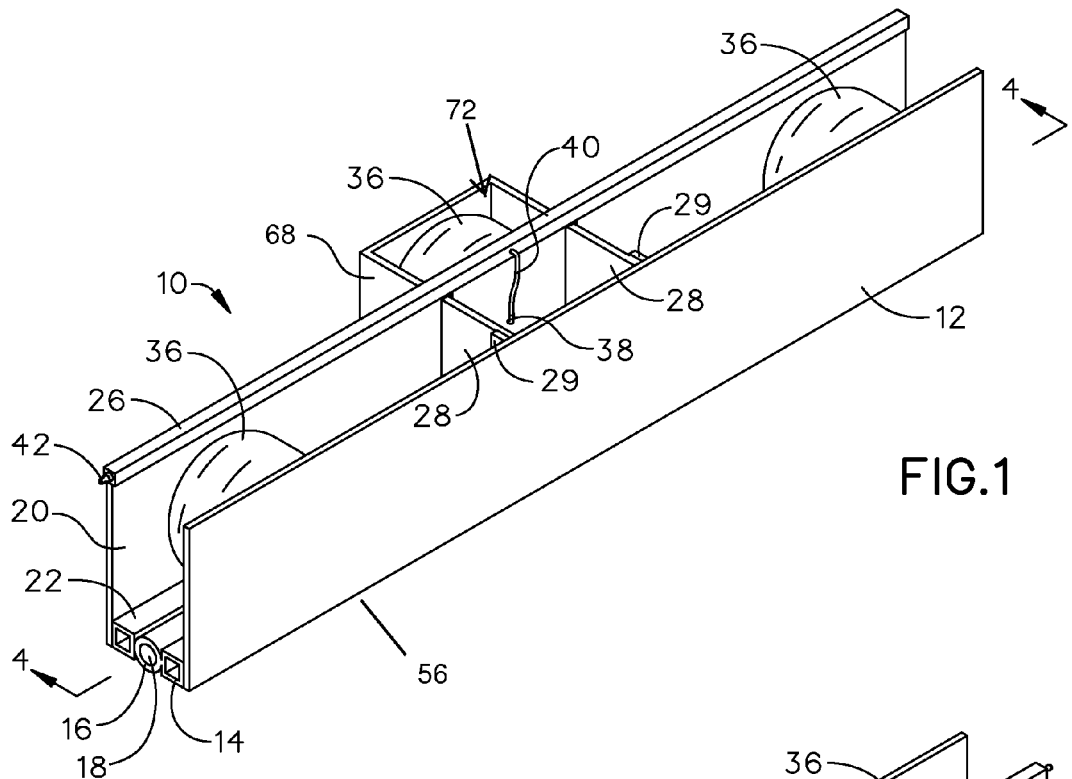
FIG. 1 is a front perspective view of an exemplary embodiment of the present invention.

In certain embodiments, the framework 90 may provide a rebound element 70. The rebound element 70 may be configured to provide longitudinal stability, keeping one suspension plate from popping back up too quickly relative to the opposing suspension plate. The rebound element 70 may include a U-shaped bracket 66 having two legs 28 perpendicularly joined to the first plate 12, wherein a portion of the two legs 28 slide through two complementary slots 52 defined by the second plate 20, whereby a remaining portion 68 not between the plates 12, 20 form part of a shelf nook 72, as illustrated in FIGS. 1 and 2. In certain embodiments, two tabs 33 extend transverse the first plate 12 so as the connect the two legs 28 to said first plate 12 by means of fasteners, such as but not limited to, bolts 30, washers 31, nuts 32 and the like, interconnecting through complementary bracket holes 34 and tab holes 33, as illustrated in FIG. 3. One air bag 36 may be compactly nested within the shelf nook 72.

Each air bag 36 may comprise a cylindrical shaped body made of pliable material and forming an air-tight cavity for receiving air 54. Each air bag 36 may be filled with air 54 so as to be secured between the pair of suspension plates 12, 20 and/or with the shelf nook 72, biasing said suspension plates 12 and shelf nook. The air bag 36 within the shelf nook 72 may be referred to as the nook air bag 36. In certain embodiments, each body provides a nozzle 38 projecting outwardly from the body, wherein the nozzle 38 is in communication with the cavity. An air bag hose 40 may be connected to each nozzle 38. Each air bag hose 40 may be connected to an air supply 26 for maintaining a predetermined air pressure within the cavity. In certain embodiments, the air supply 26 may be affixed to one of the suspension plates 12, 20. In such embodiments, the air supply 26 may provided a nozzle 42, air supply holes 48, 50 to facilitate the delivery of the air 54 to the plurality of air bags 36. In certain embodiments, the air bag hoses 40 may slidably extend through cooperating air holes 46 formed the first and/or second plate 12, 20.

A method of using the present invention may include the following. The suspension system 10 described above may be provided. A user may compactly nest two air bags 36 between the parallel suspension plates 12, 20, one on opposite sides of the framework 90, as illustrated in FIGS. 1 through 3.

In certain embodiments, the air bags 36 may be pneumatically connected to the air supply 60 so that the predetermined air pressure is established. The predetermined air pressure may be user-adjusted, while in use, for specified suspension spring action demanded by various or varying conditions, comfort levels, weight distributions between the opposing air bags 36, and the like.

In certain embodiments, the rebound element 70 may be provided and configured to provide longitudinal stability, again by establishing an adjustable air pressure within the air bag 36 nested within the shelf nook 72.

The suspension system 10 may then be mounted to an undercarriage of, for example, a vehicle, so as to substantially absorb impact forces of the vehicle. In some embodiments, the suspension system 10 may be mounted to an area that is unused or has be vacated by an inferior pre-existing suspension system so as to retro-fit the suspension system 10 to a piece of equipment or vehicle.

It should be understood, of course, that the foregoing relates to exemplary embodiments of the invention and that modifications may be made without departing from the spirit and scope of the invention as set forth in the following claims.

What is claimed is:

1. A suspension system providing adjustable air bags, comprising:
    a pair of spaced-apart suspension plates, each having a first edge;
    a pivotable connection interconnecting the pair of first edges, thereby forming a shelf space between the pair of suspension plates; and
    a plurality of air bags having an adjustable air pressure, wherein the plurality of air bags are nested within the shelf space, wherein the air pressure is adjusted so as to at least snugly secure the plurality of air bags therein, wherein a first of the pair of suspension plates defines two cooperating slots, and further providing a U-bracket having two legs, wherein the two legs slide into the two slots and through the shelf space so as to perpendicularly connect to a second of the pair of suspension plates, thereby forming a shelf nook between the U-bracket and a portion of the first suspension plate.

2. The suspension system of claim 1, wherein at least one of the plurality of air bags is disposed near each opposing end of the shelf space.

3. The suspension system of claim 2, further providing an air supply connected to at least one of the pair of suspension plates, wherein the air supply is operably connected to the plurality of air bags.

4. The suspension system of claim 1, wherein the U-bracket is generally centered about the first of the pair of suspension plates.

5. The suspension system of claim 1, further providing a nook air bag having an adjustable air pressure, wherein the nook air bag is nested within the shelf nook.

6. The suspension system of claim 5, wherein the nook air bag is operably connected to the air supply.

7. The suspension system of claim 1, wherein the pivotable connection comprises:
    at least two rails sandwiching a plurality of spaced-apart hinge sleeves; and
    a hinge pin slidably received through the plurality of hinge sleeves.

8. The suspension system of claim 7, wherein the plurality of hinge sleeves includes a plurality of grease fittings for providing lubrication for the hinge pin.

9. A suspension system providing adjustable air bags, comprising:
    a first and second suspension plate, each having a connection edge, wherein the first suspension plate defines two cooperating slots;
    a pivotable connection interconnecting the first and second connection edges, forming a shelf space between the suspension plates, and wherein the pivotable connection comprises;
        at least two rails sandwiching a plurality of spaced-apart hinge sleeves; and
        a hinge pin slidably received through the plurality of hinge sleeves, wherein the plurality of hinge sleeves includes a plurality of grease fittings for providing lubrication for the hinge pin;
    a U-bracket having two legs slidably received into the two slots and through the shelf space so as to perpendicularly connect to the second suspension plate forming a shelf nook between the U-bracket and a portion of the first suspension plate;

three air bags having an adjustable air pressure, wherein two of the three air bags are nested within the shelf space at opposing ends thereof, wherein a third air bag is nested within the shelf nook; and an air supply connected to at least one of the first and second suspension plates, wherein the air supply is operably connected to the three air bags.

\* \* \* \* \*